United States Patent [19]
Linhardt

[11] 4,236,868
[45] Dec. 2, 1980

[54] TANGENTIAL RIF TURBINE WITH PARTICLE REMOVING MEANS

[75] Inventor: Hans D. Linhardt, Newport Beach, Calif.

[73] Assignee: Airco, Inc., Montvale, N.J.

[21] Appl. No.: 926,042

[22] Filed: Jul. 19, 1978

[51] Int. Cl.$^3$ .................. F01D 25/32; F01D 9/02
[52] U.S. Cl. .................. 415/121 A; 415/202
[58] Field of Search ............ 415/81, 121 A, 168, 415/159, 160, 185, 202, 203, 204, 205, 213 A, 213 C; 55/404, 405, 406

[56] References Cited

U.S. PATENT DOCUMENTS

| | | | |
|---|---|---|---|
| 470,035 | 3/1892 | Brantingham | 55/406 |
| 1,415,219 | 5/1922 | Carrey | 415/168 X |
| 2,878,627 | 3/1959 | Morgan | 55/405 |
| 3,066,912 | 12/1962 | Scheper, Jr. | 415/121 A |
| 3,274,757 | 9/1966 | Wapler | 415/205 |
| 3,785,128 | 1/1974 | Redemann | 55/405 |
| 3,944,380 | 3/1976 | Kampe | 415/121 A |

FOREIGN PATENT DOCUMENTS 1955966 6/1970 Fed. Rep. of Germany ............ 55/406

Primary Examiner—Leonard E. Smith
Attorney, Agent, or Firm—Roger M. Rathbun; Edmund W. Bopp; Larry R. Cassett

[57] ABSTRACT

A radial inflow turbine is disclosed utilizing a star wheel type of blade and wherein the inlet nozzles are located along the sides or lateral of the blade tips rather than located radially beyond the blade tips. The side approach enables the turbine to include an annular chamber outside of the moving blades and where small particles are centrifuged during operation and collected. The incoming hot gases, that propel the blades, pass through approximately a 90° turn and continue radially inwardly. The large particles hit the turbine blades and are projected outwardly into the annular chamber for collection and subsequent removal while the smaller particles may be centrifuged in the stream of gas and immediately thrown outwardly. The turbine is capable of removing particles to as small as 2–3 microns ($\mu$m).

8 Claims, 5 Drawing Figures

TANGENTIAL RIF TURBINE WITH PARTICLE REMOVING MEANS

BACKGROUND OF INVENTION

There are numerous industrial processes where it is necessary to convert the energy of a pressurized stream of gas into rotational energy, particularly in processes where some reaction is involved which gives off a hot, relatively high pressure gas, such as processes for coal gasification.

In recovering power from such high pressure gases, i.e. letdown, an expansion turbine is frequently used and in some instances, a radial inflow turbine is utilized in which rows of nozzles direct the high pressure gas onto the outside ends of vanes of a rotatable wheel, the motive fluid thereby gives up its pressure energy to the wheel and the fluid is exhausted along the axis of the wheel at some lower pressure.

One difficulty that is encountered in such turbines and in the systems in which they are used, is that some streams of high pressure motive gas contain solid particulate matter which erodes away the material of the turbine blades, eventually leading to their failure and thus expensive downtime during which blade replacement can be accomplished. The solid particulate matter, or particles is inherent in certain industrial and chemical processes and, unless removed, can cause damage to the main letdown turbine or to further rotating equipment downstream of such turbine.

In particular, in several of the processes now under investigation for coal gasification, a stream of high-temperature, high pressure gas is produced which contains a relatively high percentage, i.e. as much as 1–2% of solid particles which are extremely hard and erosive to turbine blade surfaces. Also, the process currently used in refineries to produce lighter fuels, such as gasoline from crude oil known as the fluid catalytic cracking process, also inherently produces a hot, high pressure gas stream containing particles in this case, minute catalyst particles that are carried downstream.

Since it is important for plant efficiency, and in some instances to to very economics of the process itself, to extract some of the power from the then developed hot, high pressure gases, the use of a turbine is desirable. The gas streams, being heavily laden with erosive particles, must somehow be treated to remove particles to prevent erosion of downstream equipment.

In such hot gas streams, conventional filtration techniques have limitations that detract or prevent their use. For example, since such gas streams are generally high temperature gases (on the order of 825° C.) and high pressure, conventional filter and bag houses are not practical. Cyclone separators, on the other hand, may be capable of functioning under higher temperature gases but they cannot separate particles smaller than about 5 microns. Smaller particles are, however, still erosive to blade surfaces.

In either instance, the device or means used introduces some finite pressure drop which is all lost, that is, none of the energy given up during the pressure drop is recovered as useful energy.

Attempts have been made in the turbine prior art to construct a letdown turbine capable of converting the energy in the high pressure gas to useful rotational energy while effecting some particulate separation, as in U.S. Pat. No. 3,944,380, but such prior art turbines are susceptible of erosion in the turbine nozzle block resulting from the hot gas containing particles being centrifuged outwardly and being circulated around the nozzle block with high velocity prior to bleeding to external collection device. The sliding of such particles through small passageways or along the blades still cause erosion.

SUMMERY OF INVENTION

The present invention satisfies the needs of the art mentioned above by providing a radial inflow turbine having a star wheel rotor and having its inflow nozzles disposed at either side or lateral of the turbine wheel blade tips. An annular, plenum chamber thereby is positioned concentric with and outer of the turbine wheel. The plenum chamber is in continuous communication with the chamber in which the turbine wheel rotates. As the hot, high pressure gases enter through the nozzles, the gas containing the particles is forced to make a sharp, approximately 90° turn from a direction tangential to the turbine wheel blades to a direction radially inwardly of the wheel. Since the large particles slip in relation to the gas velocity, they will strike the back side of the blade, then motion is stopped and they are flung outwardly. The smaller particles will be caught up by centrifugal force and are thrown outwardly into the plenum chamber where the large and small particles are collected and subsequently removed.

The advantage of collecting the particles, which may even be liquid particles, are many. In some processes, the particles are extremely hot and the removed particles may, after removal, be passed through a heat transfer device, such as a fluidized bed, and the heat extracted from the particles for practical use.

The removal of particles further may eliminate a pollution problem where the letdown gas stream is vented to atmosphere or burned prior to such venting. Also, some particles are potentially carcinogenic and therefore removal from gas streams is desirable from a health standpoint of workers or others near the discharge area.

Finally, the streams of gas containing particles are highly susceptible of clogging further pipes or conduits used for discharge.

Thus, the radial inflow turbine of the present invention is capable of removing particles from a hot high pressure gas stream and yet recovers energy from the reduction of pressure. Also, the turbine can separate particles down to a size of about 2–3 microns, or essentially to the point where almost all of the erosive particulate matter is removed. Conventional compression equipment may be used to pressurize the gas for distribution purposes or reuse.

In addition, since the flow of gas containing the particles is through a relatively large chamber, there is a minimum of erosion in the turbine blades used with the present turbine.

BRIEF DESCRIPTION OF THE DRAWINGS

The invention is diagrammatically illustrated by way of example in the drawings appended hereto, in which.

DESCRIPTION OF THE PREFERRED EMBODIMENT

Figure 1:
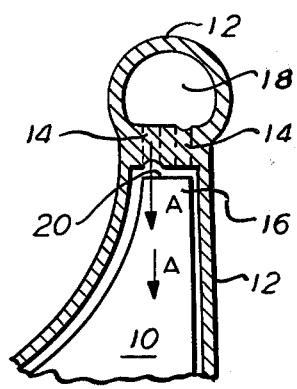
FIG. 1 is a cross-sectional view along a diameter of a radial inflow turbine showing the location of nozzles as found in the prior art.

In FIG. 1 herein, there is shown the basic nozzle arrangement of a prior art radial inflow turbine. As shown, the turbine comprises a turbine wheel 10 which rotates about an axis (not shown) in a direction toward or away from the drawing sheet. The turbine wheel 10 is enclosed within a housing 12. A plurality of nozzles 14 are disposed radially outside the diameter of the turbine wheel 10 and are directed toward the outer blades 16 of turbine wheel 10. The nozzle 14 receives the hot, high pressure motive gas by means of an annular chamber 18 which is, in turn, connected to an inlet (not shown) for supplying the hot gases to chamber 18. Generally, the nozzles 14 may be adjustable and are normally arranged to direct the hot gases to impinge upon turbine outer blades 16; the absolute velocity vector is at an angle of from about 10° to about 30° measured from the tangent to the diameter of a circle described by the tips 20 of the outer blades 16. The nozzles 14 are in a plane parallel to the plane of rotation of the turbine wheel 10.

Basically the path of gas flow through the typical prior art radial inflow turbine is along the arrows A—A of FIG. 1 where the flow is radially inwardly toward the axis of the turbine wheel 10. It thereafter, during expansion, continues axially along the axis of the turbine wheel 10 and leaves the turbine by means of an outlet along such axis.

Figure 5:
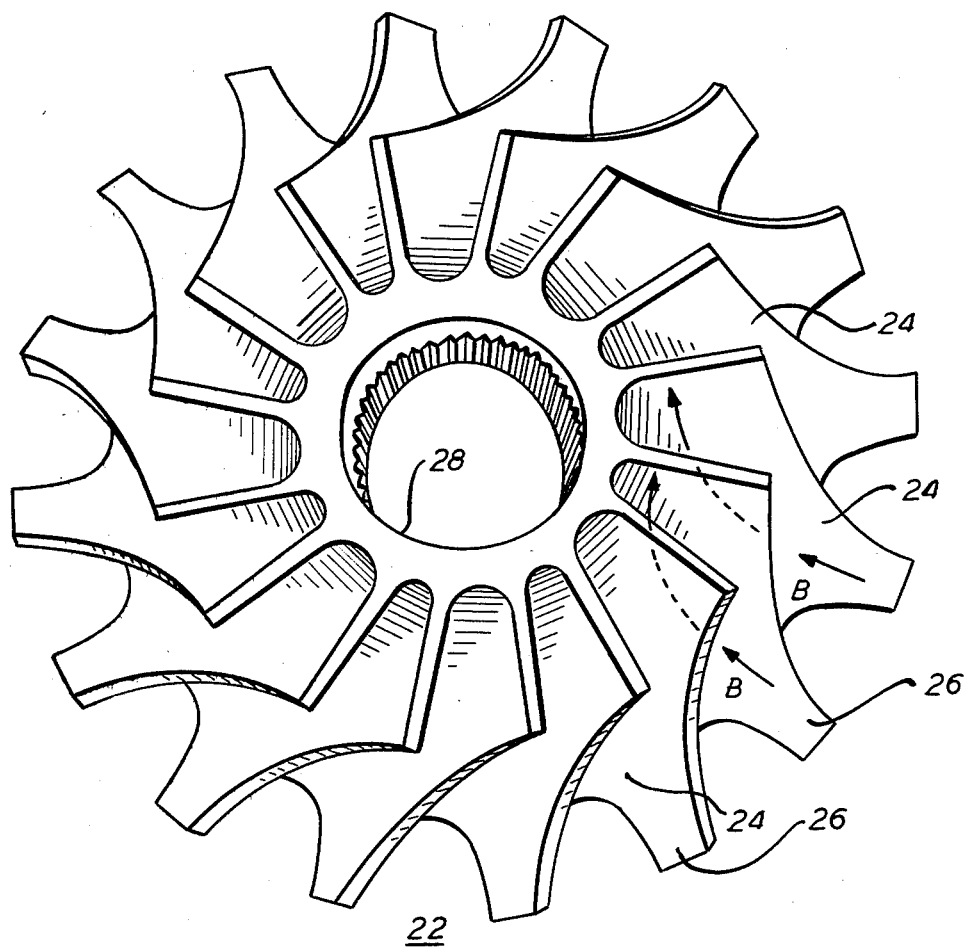
FIG. 5 is a perspective view of a star wheel type of turbine wheel used with the present invention.

The actual flow of the hot, high pressure gases through a conventional radial inflow turbine exemplified in FIG. 1 is known in the art and may be further explained by reference to FIG. 5 showing a star wheel type of turbine wheel used with both conventional radial inflow turbines and, as will be later made clear, with a turbine constructed in accordance with the present invention.

The star wheel type of turbine wheel 22 shown in FIG. 5 is a three dimensional wheel having a plurality of individual blades 24. The function and flow along one of the blades 24 will serve to be illustrious of the plurality of flows from individual nozzles directed toward blades 24.

In particular, the hot gases are directed towards the outer tips 26 of the blades 24 and thence, the hot gas flow is directed inwardly as along the arrows indicated as B. As shown, as the hot gas passes radially toward the axis of rotation (at the center of opening 28), the curved blades 24 also direct the gas to an axial direction along the axis of rotation. Flow continues along the axis of rotation until it leaves the turbine itself through an outlet coaxial with the axis of rotation of the turbine wheel 22.

Figure 2:
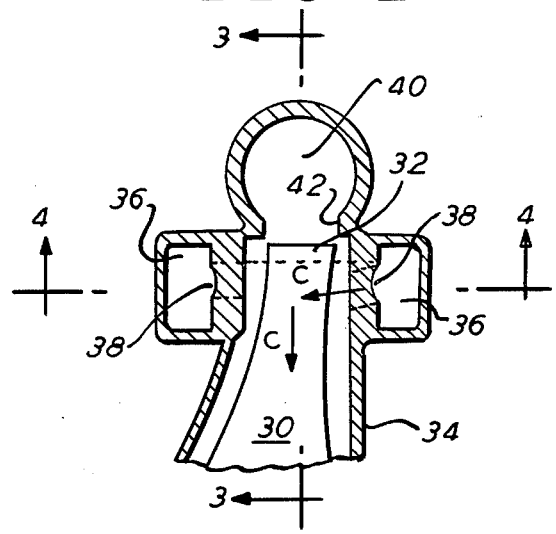
FIG. 2 is a similar cross-sectional view of a radial inflow turbine constructed in accordance with the present invention.

Turning now to FIG. 2, the radial inflow turbine constructed in accordance with the present invention is shown including a turbine wheel 30 having a plurality of outer blades 32, all mounted for rotation within a housing 34. Formed within housing 34 are a pair of annular inlet chambers 36 which are positioned at either side of the outer blades 32 and are in a plane parallel to the plane of rotation of turbine wheel 30. The inlet chambers 32 serve to receive the hot, high pressure gas from an inlet (not shown). A plurality of nozzles 38 (only two of which are shown in FIG. 2) direct the hot, high pressure gas from inlet chamber 36 to the outer blades 32 of the turbine wheel 30 to cause rotation thereof. Again, the nozzles 30 may be adjustable by known prior art means, and the flow of gas through each of the nozzles 38 intersects the face of the outer blade 32 at a velocity vector angle of between about 10° to about 30° from the plane of rotation of the turbine wheel 30 but parallel to a plane tangent to the circumference of a circle described by the tips of blades 32 as they rotate. Thus the velocity vector angle of gases from the nozzles 38 with respect to the surface of blades 32 is within the same range of the velocity vector angle achieved in the prior art radial inflow turbine, (See FIG. 1) however, in FIG. 2, the nozzles are positioned at the side or laterally of the turbine blades 32 rather than at the top and directed radially inwardly as in the FIG. 1 prior art construction.

A plenum particulate chamber 40 can therefore be positioned radially outside the blades 32 in an annular shape formed within housing 34. The particulate chamber 40 has an annular opening 42 about the same width as the outer tip of blades 32 or may be slightly smaller, i.e. about 20% smaller. The opening is preferably continuous to minimize erosion effects and surrounds the path of blades 32 and freely communicates the gas propelling blades 32 with particulate chamber 40.

Figure 3:
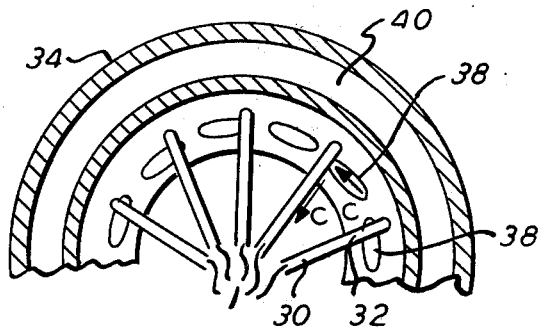
FIG. 3 is a cross-sectional view of the turbine of FIG. 2 taken along the lines 3—3 of FIG. 2.

As may now be seen in FIG. 3, the path of travel of the hot, high pressure gas directed through nozzles 38 continues through a sharp, approximately 90° turn and continues inwardly toward the axis of rotation of turbine wheel 30, note arrows marked C. Larger particles may actually hit the turbine blades 32, thereby essentially stopping their travel, and are then thrown outwardly while smaller particles generally will be unable to make the sharp turn and are caught by the centrifugal force, then moving radially outwardly and deposited in particulate chamber 40.

Figure 4:
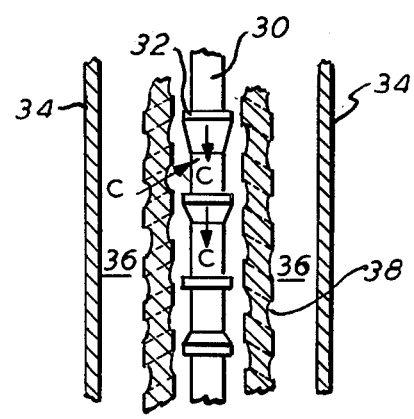
FIG. 4 is a cross-sectional view of a turbine of FIG. 2 taken from the top along the lines 4—4.

In FIGS. 3 and 4, the different views of the turbine of the subject invention are shown, particularly, the location of the nozzles 38 and their directional situs with respect to the turbine wheel 30.

Again, the turbine wheel 30 is within housing 34 and rotates therein. The outer turbine blades 32 are generally in alignment with nozzles 38 which direct the hot, high pressure from inlet chamber 36 toward blades 32. In FIG. 4, the direction of the hot gas through nozzle 38 is shown by arrows C and, as will be evident, the nozzles 38 can direct the gas at a predetermined angle with respect to the faces of blades 32.

As the particulate chamber 40 receives particulate matter, the chamber 40 eventually becomes filled with particles and, periodically, or at a slow steady rate so as not to obtain a large pressure drop, the particles can be removed from particulate chamber 40. Such removal means could be a port at the bottom of chamber 40 for removal of particles or suitable valving for the removal of liquid particles.

The present radial inflow turbine can be constructed with clearances having standard turbine practice and, although subsonic tip speeds can be used, the centrifugal force is increased with speed and therefore supersonic speeds are preferable, therefore, as a rule, the higher the gas velocity, the higher the efficiency of particulate removal achieved by the turbine herein described.

I claim:

1. A radial inflow turbine for recovery of power from a stream of expandable gases while removing particles from the gas comprising:
    a turbine housing,
    a turbine wheel contained within said housing and adapted to rotate therein about an axis of rotation, said turbine wheel having a plurality of turbine blades located at a predetermined radius from said axis of rotation,
    a plurality of inlet nozzles disposed in a circle adjacent said blades and having about the same radius as the radius of said blades, said nozzles located lateral to the midplane of rotation of said turbine wheel, said nozzles and said turbine wheel adapted to direct said gas through a sharp turn of about 90° after leaving said nozzles, and
    an annular plenum chamber coaxially encircling said turbine blades and having a radius larger than the radius of said blades, said annular plenum being in communication with said blades and adapted to receive particles centrifuged from said expandable gas as it passes from said nozzle toward said blades.

2. A method of removing particles from an expandable gas stream comprising the steps of:
    flowing the stream of gas containing particles through a radial inflow turbine having a turbine wheel,
    directing said flow of gas through a plurality of streams tangentially toward the blades of the turbine wheel from both lateral sides of said turbine wheel,
    further directing the flow of gas from the blades inwardly through a sharp angle toward the axis of rotation of the turbine wheel, thereby centrifuging the particles outwardly with respect to the axis of rotation, and collecting the particles centrifuged outwardly.

3. A radial inflow turbine for recovery power from a stream of expandable gases while removing particles from the gas comprising:
    a turbine housing,
    a turbine wheel contained within said housing and adapted to rotate therein about an axis of rotation, said turbine wheel having a plurality of turbine blades located at a predetermined radius from said axis of rotation,
    a plurality of inlet nozzles disposed in a circle adjacent said blades and having about the same radius as the radius of said blades, said nozzles located lateral to the midplane of rotation of said turbine wheel,
    said nozzles adapted to direct the gas at a sharp angle with respect to the midplane of rotation of said turbine wheel such that said gas travels through a sharp angle radially inwardly toward the center of rotation of said turbine wheel,
    an annular plenum chamber coaxially encircling said turbine blades and having a radius larger than the radius of said blades, said annular plenum being in communication with said blades and adapted to receive particles centrifuged from said expandable gas as it passes from said nozzles toward said blades.

4. The radial inflow turbine of claim 3 wherein said nozzles direct the gas tangentially towards said blades, and said sharp angle is approximately 90°.

5. A radial inflow turbine comprising:
    a turbine housing,
    a radial inflow turbine wheel rotatably mounted within said housing and having a plurality of turbine blades,
    said turbine housing having a plurality of nozzles adapted to direct a high pressure gas toward said turbine blades to cause rotation of said turbine wheel,
    said nozzles being lateral of the midplane of rotation of said turbine wheel and further disposed to direct said gas essentially tangentially to the circle formed by rotation of said blades,
    said nozzles further directing said gas at a sharp angle with respect to the midplane of rotation such that said gas travels through a sharp angle radially inwardly toward the center of rotation of said turbine wheel,
    an annular plenum chamber disposed concentrically about the outside of said turbine blades and being in gas flow communication with said turbine blades,
    said plenum chamber adapted to receive particles centrifuged by the rotation of said turbine blades and propelled outwardly thereof.

6. The radial turbine of claim 1 wherein said particles are liquid.

7. The radial turbine of claim 1 wherein said plurality of nozzles comprises two sets of nozzles oppositely disposed with respect to said turbine blades.

8. The radial turbine of claim 7 wherein said plurality of nozzles further comprises a pair of annular inlet chambers for receiving the high pressure gas, said inlet chambers being oppositely disposed laterally about said turbine wheel and in planes parallel to the plane of rotation of said turbine wheel, the diameter of said inlet chambers being about the same diameter as said turbine blades.

* * * * *

UNITED STATES PATENT AND TRADEMARK OFFICE
CERTIFICATE OF CORRECTION

PATENT NO. : 4,236,868
DATED : July 19, 1978
INVENTOR(S) : HANS D. LINHARDT

It is certified that error appears in the above-identified patent and that said Letters Patent are hereby corrected as shown below:

Col. 6, line 40, delete "1" and in place thereof insert -- 5 --;

line 42, delete "1" and in place thereof insert -- 5 --.

Signed and Sealed this

Twenty-eighth Day of April 1981

[SEAL]

Attest:

RENE D. TEGTMEYER

Attesting Officer

Acting Commissioner of Patents and Trademarks